United States Patent
Ozol et al.

(10) Patent No.: US 11,046,052 B1
(45) Date of Patent: Jun. 29, 2021

(54) PROTECTIVE COVERS AND METHODS OF MANUFACTURE AND USE

(71) Applicant: Transhield, Inc., Elkhart, IN (US)

(72) Inventors: Seckin Ozol, South Bend, IN (US); Gregory L. Todt, Union, MI (US); Na Qi, Granger, IN (US)

(73) Assignee: Transhield, Inc., Elkhart, IN (US)

( * ) Notice: Subject to any disclaimer, the term of this patent is extended or adjusted under 35 U.S.C. 154(b) by 0 days.

(21) Appl. No.: 16/881,515

(22) Filed: May 22, 2020

(51) Int. Cl.
*B32B 7/12* (2006.01)
*B32B 5/16* (2006.01)

(52) U.S. Cl.
CPC .................. *B32B 7/12* (2013.01); *B32B 5/16* (2013.01); *B32B 2307/726* (2013.01)

(58) Field of Classification Search
CPC ........ B32B 7/12; B32B 5/16; B32B 2307/726
USPC .......................................................... 442/76
See application file for complete search history.

(56) References Cited

U.S. PATENT DOCUMENTS

| | | | |
|---|---|---|---|
| 5,705,566 A | 1/1998 | Todt | |
| 5,736,231 A | 4/1998 | Todt | |
| 6,444,595 B1 | 9/2002 | Elkouh et al. | |
| 6,562,740 B1 | 5/2003 | Todt | |
| 6,696,120 B1 | 2/2004 | Todt | |
| 6,875,712 B2 | 4/2005 | Todt | |
| 7,074,288 B2 | 7/2006 | Todt | |
| 7,645,507 B2 | 1/2010 | Vermunicht et al. | |
| 7,687,123 B2 | 3/2010 | Broadus et al. | |
| 7,744,806 B2 | 6/2010 | Broadus et al. | |
| 8,637,139 B2 | 1/2014 | Todt et al. | |
| 8,828,487 B2 | 9/2014 | Todt et al. | |
| 8,883,284 B2 | 11/2014 | Todt et al. | |
| 9,718,998 B2 | 8/2017 | Todt et al. | |
| 10,633,567 B2 | 4/2020 | Dubois | |
| 10,675,779 B2 | 6/2020 | Ozol et al. | |
| 2011/0092120 A1 | 4/2011 | Todt et al. | |

FOREIGN PATENT DOCUMENTS

| | | |
|---|---|---|
| WO | 2009143251 A2 | 11/2009 |
| WO | 2010022066 A2 | 2/2010 |

OTHER PUBLICATIONS

Vieth, Wolf R., Diffusion in and Through Polymers Principles and Applications: Chapter 4 The Permeation Process, 1991, pp. 73-110, Oxford University Press, New York, USA.
Kraton Polymers LLC, Kraton Launches Styrenic Block Copolymers (SBC) for Coextruded Pressure Sensitive Adhesive Films, Feb. 17, 2006, 2 pages.
Miksic, Boris and Rudman, Barry, A Recent Breakthrough in Shrink Film Technology, Jul. 23, 1998, 9 pages.

(Continued)

*Primary Examiner* — Vincent Tatesure
(74) *Attorney, Agent, or Firm* — Barnes & Thornburg LLP

(57) ABSTRACT

A cover includes a film, a composite layer, and an edge wrap. The composite layer has a first fibrous layer connected to the film, scrim, and a second fibrous layer. The first fibrous layer has a hydrophilicity, the scrim has a hydrophilicity that is less than the hydrophilicity of the first fibrous layer, and the second fibrous layer has a hydrophilicity less than the hydrophilicity of the scrim. The edge wrap surrounds a portion of the film and a portion of the composite layer. The edge wrap has a nonwoven layer having a hydrophilicity greater than the hydrophilicity of the first fibrous layer, a covering, and an edge seal.

19 Claims, 5 Drawing Sheets

(56) References Cited

OTHER PUBLICATIONS

Li, Julie, Styrenic Block Copolymers in Medical Applications, InterPlas Thailand, Jun. 20, 2013, Bangkok, 37 pages.
Wilson, Reuben D., Styrenic Block Copolymers, ASI Adhesives & Sealants Industry, Sep. 1, 2008, 9 pages.
Ebnesajjad, Sina and Ebnesajjad, Cyrus, Surface Treatment of Materials for Adhesion Bonding, 2006, pp. 79, 207, 211 and 245, William Andrew Publishing New York, USA.

PROTECTIVE COVERS AND METHODS OF MANUFACTURE AND USE

The present invention relates to protective covers, and, in particular, to protective covers having components with differing hydrophilic/hydrophobic properties. The present invention also relates to methods of making and using such covers.

BACKGROUND AND SUMMARY OF THE INVENTION

Protective covers are known in the prior art. For example, U.S. Pat. No. 6,696,120 discloses a protective cover having a non-woven fabric and a woven scrim having apertures. The fibers from the non-woven fabric are forced into the apertures of the scrim and the scrim reinforces the non-woven fabric. A shrinkable, stretchable film is intermittently bonded to the non-woven fabric. The film may be shrunk after the cover is placed around an object to be protected.

U.S. Pat. No. 6,444,595 discloses a cover having an inner surface having a liquid-permeable layer and an outer surface having a liquid-impermeable layer. A moisture-absorbing layer is positioned between the liquid-permeable layer and the liquid-impermeable layer. A radar-influencing layer and/or vapor corrosion inhibitors may be included in the cover.

In one embodiment of the present invention, a cover includes a film, a composite layer, and an edge wrap. The composite layer has a first fibrous layer connected to the film, a scrim, and a second fibrous layer. The first fibrous layer has a hydrophilicity, the scrim has a hydrophilicity that is less than the hydrophilicity of the first fibrous layer, and the second fibrous layer has a hydrophilicity that is less than the hydrophilicity of the scrim. The edge wrap surrounds a portion of the film and a portion of the composite layer. The edge wrap has a nonwoven layer, a covering, and an edge seal. The nonwoven layer of the edge wrap has a hydrophilicity greater than the hydrophilicity of the first fibrous layer.

In one embodiment, the film is a heat shrinkable film.

In another embodiment, the film is constructed at least in part from a styrenic block copolymer. In certain embodiments, the styrenic block copolymer is styrene-ethylene/butylene-styrene. In other embodiments, the styrenic block copolymer is styrene-ethylene/propylene-styrene.

In another embodiment, the film has an inner layer connected to the first fibrous layer, at least one middle layer, and an outer layer. In certain embodiments, the inner layer includes a first amount of an antiblocking agent and the outer layer includes a second, lesser amount of an antiblocking agent.

Other embodiments include an adhesive layer between the first fibrous layer and the film. The film and the adhesive layer may each include a styrenic block copolymer. In certain embodiments, the styrenic block copolymer in the film and the styrenic block copolymer in the adhesive are from the same family of styrenic bock copolymers. Other embodiments include an adhesive incorporated into the film.

In certain embodiments, the scrim is located between the first fibrous layer and the second fibrous layer. In other embodiments, the composite layer is perforated.

In other embodiments of the invention, the covering of the edge wrap has at least one opening, and the edge seal has at least one opening aligned with the opening in the covering. Certain embodiments include a funnel extending through the opening in the covering and the opening in the edge seal.

In one embodiment of the present invention, a cover includes a film, a composite layer and an edge wrap. The composite layer has a fibrous layer connected to the film. The fibrous layer has a hydrophilicity. The edge wrap surrounds a portion of the film and a portion of the composite layer. The edge wrap has a nonwoven layer having a hydrophilicity greater than the hydrophilicity of the fibrous layer.

In one embodiment, the film is a heat shrinkable film.

In another embodiment, the film is constructed at least in part from a styrenic block copolymer.

In other embodiments, the film has an inner layer connected to the fibrous layer, at least one middle layer, and an outer layer. In certain embodiments, the inner layer includes a first amount of an antiblocking agent and the outer layer includes a second, lesser amount of an antiblocking agent.

In one embodiment, the cover further includes an adhesive layer between the fibrous layer and the film. In certain embodiments, the film and the adhesive layer each include a styrenic block copolymer. In one embodiment, the styrenic block copolymer of the adhesive layer is from the same family of styrenic bock copolymers as the styrenic block copolymer of the film.

Certain embodiments include an adhesive incorporated into the film.

In one embodiment, the composite layer is perforated.

In other embodiments, the edge wrap has at least one opening.

In one embodiment of the present invention, a method of making a cover includes the steps of providing a heat shrinkable film constructed at least in part from a styrenic block copolymer, providing a composite layer, providing an adhesive layer between the film and the composite layer, the adhesive layer including a styrenic block copolymer selected from the same family as the styrenic block copolymer of the film, and laminating the film to the composite layer.

In one embodiment, the method includes the step of incorporating an adhesive into the film.

In another embodiment, the method includes the step of perforating the composite layer prior to laminating the composite layer to the film.

In certain embodiments of the invention, the film has an edge, the composite layer has an edge, and the method includes the step of providing an edge wrap and at least partially surrounding the edge of the film and the edge of the composite layer with the edge wrap after laminating the composite layer to the film.

In one embodiment of the present invention, a method of using a cover to protect an object includes the steps of providing a cover having a heat shrinkable film, a composite layer connected to the film, and one or more edges, placing the cover over the object to be protected, securing the edges of the cover against movement, and applying heat to the film to shrink the film so as to at least partially conform the cover to the shape of the object to be protected.

These and other features of the present invention will become apparent to those skilled in the art from the following description of embodiments of the invention and the accompanying drawings.

DETAILED DESCRIPTION OF EMBODIMENTS OF THE INVENTION

Figure 1:
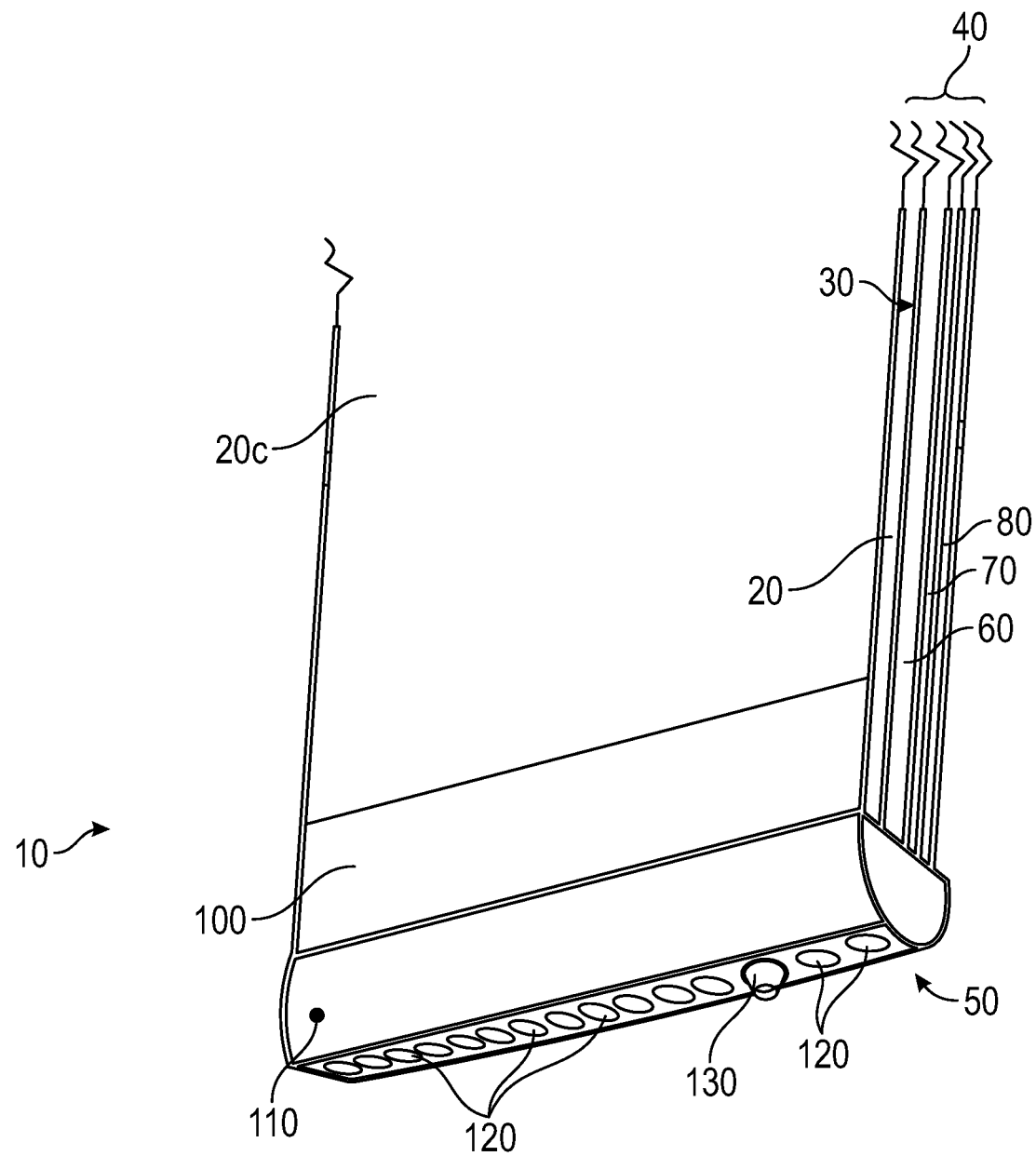
FIG. 1 is a perspective view of a section of a protective cover according to one embodiment of the present invention.

FIG. 1 is a perspective view of a section of a protective cover 10 according to one embodiment of the present invention. In the embodiment shown, cover 10 generally includes a film 20, adhesive 30, a composite layer 40, and an edge wrap 50. In the embodiment shown, composite layer 40 includes a first fibrous layer 60, a scrim 70, and a second fibrous layer 80, and edge wrap 50 includes a nonwoven layer 90, a covering 100 and an edge seal or tape 110.

In certain embodiments of the invention, film 20 is a multilayer coextruded film. In some embodiments, film 20 is a shrink film and, in particular, a heat shrinkable film. In the embodiment shown in the figures, film 20 is a multilayer, coextruded shrink film. Film 20 can have any number of layers, depending on the application to which cover 10 will be put. In one embodiment of the present invention, film 20 has an inner layer 20A facing first fibrous layer 60, one or more middle layers 20B, and an outer layer 20C. In the embodiment shown, film 20 includes three middle layers 20B, indicated as middle layer 20B1, 20B2 and 20B3. Inner layer 20A, middle layers 20B, and outer layer 20C may be the same thickness or different thicknesses. In the embodiment shown, (a) the thickness of inner layer 20A can range from about 10% to about 20% of the thickness of film 20, (b) the thickness of middle layer 20B1 can range from about 10% to about 30% of the thickness of film 20, (c) the thickness of middle layer 20B2 can range from about 30% to about 60% of the thickness of film 20, (d) the thickness of middle layer 20B3 can range from about 10% to about 30% of the thickness of film 20, and (e) the thickness of outer layer 20C can range from about 10% to about 20% of the thickness of film 20.

In one embodiment, inner layer 20A includes from about 30% to about 100% of a styrenic block copolymer selected from the group of saturated thermoplastics, such as styrene-ethylene/butylene-styrene (SEBS) and styrene-ethylone/propylene-styrene (SEPS). One example of a suitable styrenic block copolymer is Kraton G-1657, which is available from Kraton Polymers U.S., LLC of Houston, Tex. Other suitable SEBS and SEPS products include, but are not limited to, (a) KG-1924, KG-1900 and KG-1901 available from Kraton Polymers U.S., (b) Taipol® 6150 and Taipol® 6014 available from TSRC Corporation of Kaohsiung City, Taiwan, Republic of China, and (c) Calprene® 501 and Calprene® 6110P available from Dynasol Elstomeros, S.A. of Madrid, Spain. In one embodiment of the present invention, inner layer 20A of film 20 includes more than one styrenic block copolymer. In certain embodiments, inner layer 20A of film 20 includes both Kraton G-1657 and KG-1901. Using two different styrenic block copolymers that have different melting points can create a stronger bond with composite layer 40 when film 20 is laminated to composite layer 40 as described below. This is because copolymers having different melting points will more easily disperse through film 20 and adhesive 30 during lamination.

The balance of inner layer 20A, in certain embodiments of the invention, can include other thermoplastic materials, such as high density polyethylene (HDPE), low density polyethylene (LDPE), and/or fractional melt LDPE (fmLDPE). Inner layer 20A can also include antiblocking agents. In certain embodiments, inner layer 20A includes an additive masterbatch, which can include coloring agents, UV stabilizers, antioxidants and/or other additives. In one embodiment of the present invention, inner layer 20A includes from about 32% to about 98% of one or more styrenic block copolymers, from about 0% to about 55% HDPE, from about 0% to about 20% fmLDPE, from about 0% to about 10% additive masterbatch, and from about 2% to about 3% antiblocking agent.

Resins suitable for use in middle layers 20B of film 20 are chosen to have good tensile strength and tear resistance, a low modulus of elasticity (which makes it easier to drape cover 10 over objects to be protected as discussed below), and ease of heat weldability. Examples of suitable resins include, but are not limited to (a) high molecular weight fm LDPE such as LD-051 and LD-071 available from ExxonMobil of Irving, Tex., and (b) Agility® 2001 and Agility® 6047 available from The Dow Chemical Company of Midland, Mich. In certain embodiments of the invention, the LDPE is blended with metallocene linear low density polyethylene (mLLDPE). Examples of suitable mLLDPE's include, but are not limited to, (a) Exceed™ 1012, 1015 and 1018 family of mLLDPE's available from ExxonMobil, and (b) Elite® 5500G and Elite® AT 6101 from Dow Chemical Company. In one embodiment of the invention, middle layers 20B of film 20 are a blend of LD-051 and an Exceed™ 1012 mLLDPE.

The balance of middle layers 20B, in certain embodiments of the invention, can include a styrenic block copolymer selected from the group of saturated thermoplastics. In certain embodiments, the styrenic block copolymer is from the same family of sytrenic block copolymers (i.e., SEBS and/or SEPS styrenic block copolymers suitable for use in hot melt adhesives and extruded films) as the styrenic block copolymer in film 20. In certain embodiments, middle layers 20B include an additive masterbatch, which can include coloring agents, UV stabilizers, antioxidants and/or other additives. In one embodiment of the present invention, middle layers 20B include from about 10% to about 70% fmLDPE, from about 20% to about 80% mLLDPE, and from about 10% to about 15% additive masterbatch. In certain embodiments of the invention, middle layers 20B1, 20B2 and 20B3 of film 20 have different compositions.

In the embodiment shown, outer layer 20C of film 20 includes a heat shrinkable resin including from about 50% to about 85% of a low modulus LLDPE and from about 10% to about 20% fmLDPE. Examples of suitable LLDPE's include, but are not limited to the Exceed™ 1012, 1015 and 1018 family of mLLDPE's available from ExxonMobil. In one embodiment of the invention, the LLDPE utilized for outer layer 20C of film 20 is capable of being hot tack welded over a wide temperature range. In one embodiment, the LLDPE may be hot tack welded over a range of from about 10° F. above the optimal hot tack welding temperature to about 3° F. below the optimal hot tack welding temperature for the material. Examples of suitable fmLDPE's include, but are not limited to LD 051.LQ fmLDPE available from ExxonMobil. The resins discussed above as being suitable for use in middle layers 20B of film 20 are also suitable for use in out layer 20C of film 20.

The balance of outer layer 20C, in certain embodiments of the invention, can include other thermoplastic materials, such as LDPE, and/or mLLDPE. Outer layer 20C can also include antiblocking agents. In certain embodiments, outer layer 20C includes an additive masterbatch, which can include coloring agents, UV stabilizers, antioxidants and/or other additives. In one embodiment of the present invention, outer layer 20C includes from about 60% to about 80% mLLDPE, from about 10% to about 20% fmLDPE, from about 5% to about 10% additive masterbatch, and from about 0% to about 2% antiblocking agent. In certain embodiments, outer layer 20C includes from about 1.0% to about 2.0% antiblocking agent. In other embodiments, outer layer 20C includes about 0.75% antiblocking agent.

In certain embodiments of the present invention, film 20 also includes a UV stabilizer, which can be incorporated into one or more of the layers of film 20. In one embodiment of the present invention, the UV stabilizer is incorporated into each layer of film 20 as part of an additive masterbatch. As described in greater detail below, film 20 is laminated to composite layer 40 during the manufacturing process. Furthermore, in certain embodiments of the present invention, the manufacturing process for cover 10 includes one or more welding steps. Accordingly, the UV stabilizer, additive masterbatch, and other additives incorporated into film 20 (as well as additives incorporated into other components of cover 10) should be selected so as to not interfere with the lamination and welding steps of the manufacturing process. In one embodiment of the present invention, the UV stabilizer is selected to have a chemistry with sufficiently high molecular weight so as to resist migration within film 20 during the manufacturing process. In one embodiment of the invention, the UV stabilizer is incorporated in an amount equal to or less than about 0.080% of the weight of film 20. Suitable UV stabilizers include, but are not limited to, multi component UV stabilizers that include a hindered amine light stabilizer, a UV absorber, a primary antioxidant, and a secondary antioxidant. For example, one UV stabilizer suitable for use with embodiments of the present invention includes IRGANOX®-B900 primary and secondary antioxidants, TINUV®-111 hindered amine light stabilizer, and CHIMASSORB® 81 UV absorber, all of which are available from BASF SE of Ludwigshafen, Germany. The various layers of film 20 can include the same UV stabilizer or, alternatively, different layers of film 20 can include different UV stabilizers.

As is known in the prior art, certain film production methods involve rolling the film while it is still somewhat hot, typically well above room temperature. As the film is rolled, one surface of the film, such as the inner surface, contacts the opposite surface of the film, such as the outer surface. This can sometimes result in the film sticking to itself on the roll. Prior art films often use antiblocking agents to prevent the film from sticking to itself. Certain prior art films utilize a minimum of 1%-2% by weight of the film of an antiblocking agent in both the inner and outer layers of a coextruded film or throughout the entire structure of a single layer film. However, as described below, certain embodiments of covers according to the present invention are intended to be heat weldable. Antiblocking agents interfere with the heat welding process. To address this issue, films 20 of certain embodiments of the present invention reduce the amount of antiblocking agent in outer layer 20C of film 20. In other embodiments, the amount of antiblocking agent in outer layer 20C of film 20 is reduced and the amount of antiblocking agent in inner layer 20A of film 20 is increased. In one embodiment of the present invention, the amount of antiblocking agent in outer layer 20C of film 20 ranges from about 0% to about 2% by weight of outer layer 20C. In another embodiment, the amount of antiblocking agent in outer layer 20C of film 20 ranges from about 1% to about 2% by weight of outer layer 20C. In another embodiment, the amount of antiblocking agent in outer layer 20C of film 20 is about 0.75% by weight of outer layer 20C. In one embodiment, the amount of antiblocking agent in inner layer 20A of film 20 ranges from about 0.5% to about 3.0% by weight of inner layer 20A. In one embodiment, the amount of antiblocking agent in inner layer 20A of film 20 ranges from about 2.0% to about 3.0% by weight of inner layer 20A. In one embodiment, the amount of antiblocking agent in outer layer 20C of film 20 ranges from about 0% to about 2% by weight of outer layer 20C and the amount of antiblocking agent in inner layer 20A of film 20 ranges from about 2.0% to about 3.0% by weight of inner layer 20A. However, it has been found that the additional antiblocking agent in inner layer 20A of film 20 can make it more difficult to laminate film 20 to composite layer 40, as described below. To compensate, SEBS and/or SEPS, such as those available from Kraton Polymers discussed above, are included in inner layer 20A of film 20 in amounts of about 30% to about 100% by weight of inner layer 20A of film 20. In certain embodiments, SEBS and/or SEPS is included in inner layer 20A of film 20 in amounts of 32% to 98% by weight of inner layer 20A of film 20. It may also be necessary to increase the temperature and/or pressure utilized during the lamination process to compensate for the adverse effect higher levels of antiblocking agent in inner layer 20A of film 20 can have on the lamination process.

The composition for one embodiment of film 20 is set forth in the following table:

| Layer | Composition |
|-------|-------------|
| 20A | 44% HDPE, 33% styrenic block copolymer, 10% fmLDPE, 10% additive masterbatch, 3% antiblocking agent |
| 20B1 | 60% fmLDPE, 30% mLLDPE, 10% additive masterbatch |
| 20B2 | 70% mLLDPE, 20% fmLDPE, 10% additive masterbatch |
| 20B3 | 70% fmLDPE, 20% mLLDPE, 10% additive masterbatch |
| 20C | 68% mLLDPE, 20% fmLDPE, 10% additive masterbatch, 2% antiblocking agent |

Adhesive 30, in the embodiment, shown, is a hot melt, pressure sensitive adhesive containing a styrenic block copolymer selected from the group of saturated thermoplastics. In one embodiment of the present invention, adhesive 30 includes SEBS and/or SEPS selected from the same family of styrenic block copolymers as that of the styrenic block copolymers used in inner layer 20A of film 20. One example of an adhesive 30 for use in the present invention is AL1262, which is available from Adherent Laboratories, Inc. of Arden Hills, Minn. Another adhesive suitable for use as adhesive 30 in embodiments of the invention is 1133 adhesive available from H.B. Fuller company of Vadnais, Minn. In certain embodiments of the present invention, adhesive 30 includes a vapor corrosion inhibitor ("VCI") 30A. In certain embodiments, adhesive 30 includes from 5% to 15% of a VCI. One example of an acceptable VCI is DESI TS1340+b, which is available from Desi Kimya ye Maden Sanayi Tic. A.S., of Istanbul, Turkey. Adhesive 30 may include additional components, such as resins, tackifiers and/or UV stabilizers. In one embodiment of the present invention, adhesive 30 has from about 20% to about 50% SEBS, from about from about 50% to about 80% resins and tackifiers, from about 0% to about 10% VCI, and from about 0% to about 1% UV stabilizer. In certain embodiments, adhesive 30 includes from about 0.5% to about 1.0% UV stabilizer. In other embodiments, adhesive 30 includes from about 0.5% to about 1.0% UV stabilizer combined with an antioxidant. The UV stabilizers discussed above as suitable for use in film 20 are also suitable for use in adhesive 30

Figure 2:
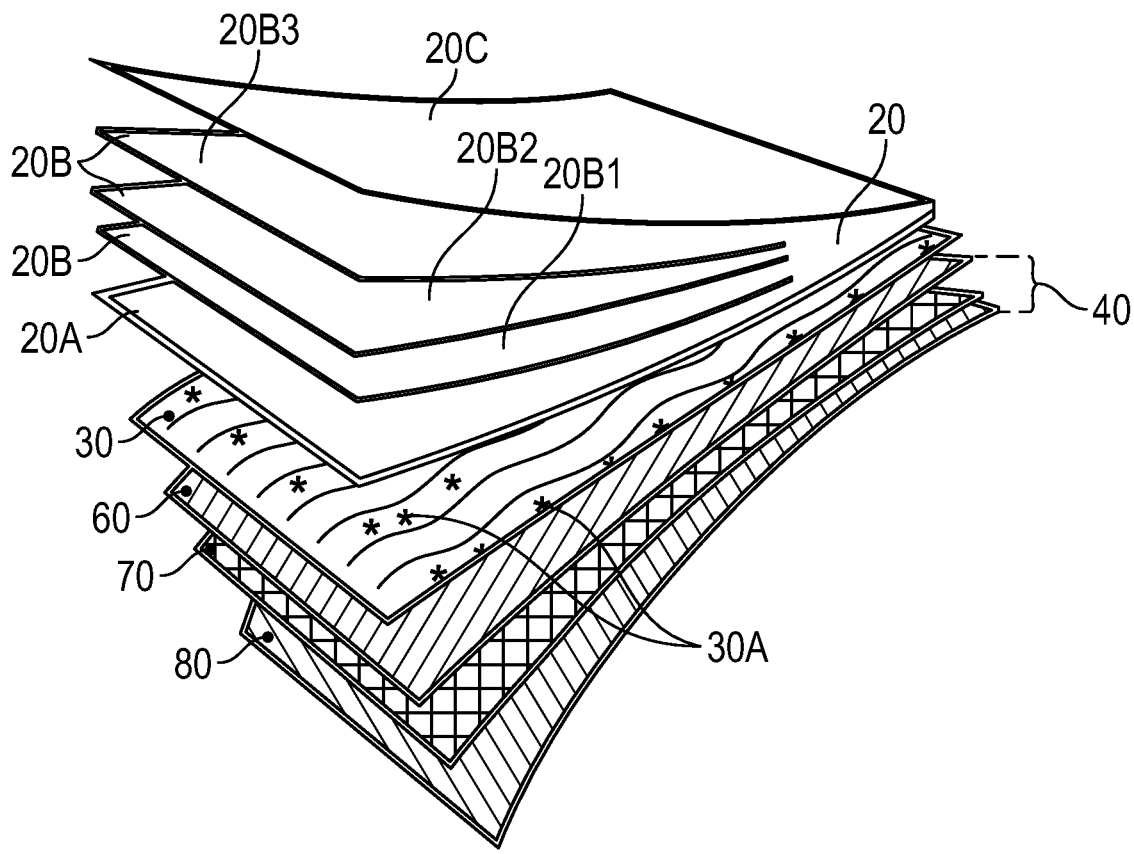
FIG. 2 is an exploded perspective view of a film and a composite layer that are components of the protective cover shown in FIG. 1.
Figure 5:
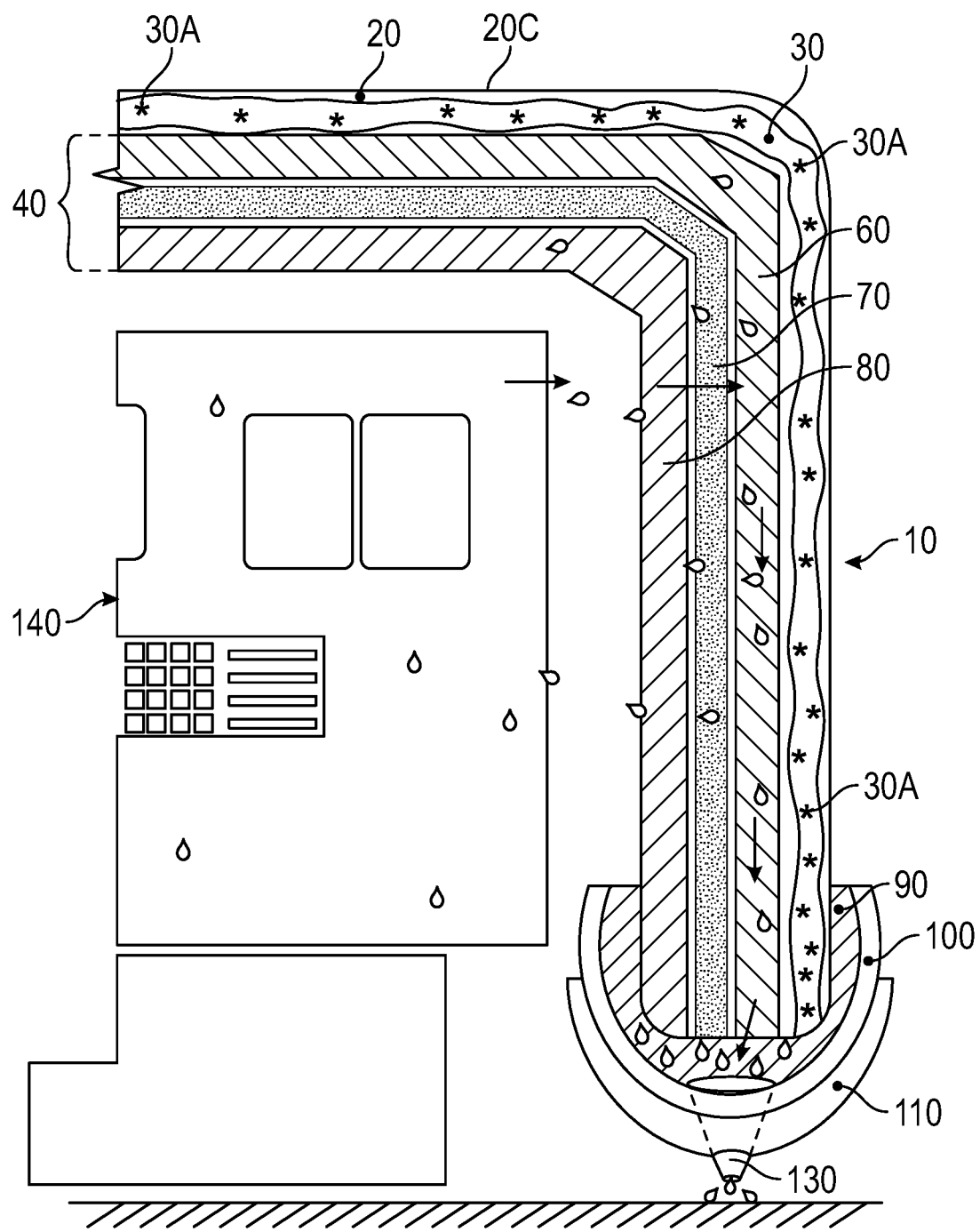
FIG. 5 is a cross sectional view of the protective cover shown in FIG. 1 positioned over an object to be protected.

Adhesive 30 may be (a) applied as a separate layer to the outer surface of inner layer 20A of film 20, and/or (b) incorporated into inner layer 20A of film 20. FIGS. 1 and 2 illustrate adhesive 30 applied as a separate layer to inner layer 20A of film 20. FIG. 5 illustrates adhesive 30 incorporated into film 20.

There are at least six classes of VCIs that can be utilized in connection with embodiments of the present invention: (1) passivating, (2) cathodic, (3) ohmic, (4) organic, (5) precipitation inducing and (6) vapor phase inhibitors. These VCIs can be amines, nitrites, triazoles, and other volatile compounds. Certain chemistries are more effective at inhibiting corrosion of certain metals. For example benzotriazole is a more effective VCI for copper, whereas cyclohexylamine carbonate is more effective for use with steel. Non limiting examples of vapor corrosion inhibitors useful in connection with embodiments of the present invention include: primary, secondary and tertiary aliphatic amines; aliphatic diamines; cycloaliphatic and aromatic amines; polymethylimines; long chain ethanolamines; imidazolines; amine salts, for example those of carbonic, carbamic, acetic, benzoic, oleic, nitrous and chromic acids; acetylenic alcoauric alcohol; alkyl chromates; organic esters of nitrous acid; organic esters of phthalic acid; organic esters of carbonic acid; nitronaphthalene; nitrobenzene; amides; mixtures of nitrites with urea, urotropine, or ethanolamines; naphthols; thiourea derivatives; heterocyclic compounds 65 such as benzotriazole, tolyltriazole, and mercaptobenzothiazole and their respective salts; nitrated or sulfonated petroleum derivatives; and organic acid derivatives.

First fibrous layer 60 of composite layer 40, in certain embodiments of the invention, is constructed from thermoplastic fibers. In one embodiment of the invention, first fibrous layer 60 is constructed from polyethylene terephthalate (PET) fibers. However, other thermoplastic fibers, such as nylon, nylon 66, cellulose, rayon, viscose and polyethylene-butylene terephthalate (PEBT), can also be used to construct first fibrous layer 60. The materials selected for first fibrous layer 60 are chosen and first fibrous layer 60 is constructed so as to be more hydrophilic than second fibrous layer 80. In certain embodiments of the invention, first fibrous layer 60 contains a combination of (a) PET and/or PEBT fibers and (b) rayon, viscose, cellulose and/or other moisture absorbent fibers. In one embodiment, about 20% to about 90% by weight of first fibrous layer 60 is PET and/or PEBT fibers. In one embodiment, first fibrous layer 60 is 30% PET and 70% viscose.

Scrim 70, in the embodiment shown, is constructed from a thermoplastic material. In one embodiment, scrim 70 is a woven structure including polyester. Scrim 70 is 100% polyester in certain embodiments of the invention. In certain embodiments, scrim 70 has enough space between the woven fibers to allow for hydroentangling the fibers of first fibrous layer 60 and second fibrous layer 80 to scrim 70. The materials for scrim 70 are selected and scrim 70 is constructed so as to be less hydrophilic than first fibrous layer 60. The composite layer 40 may be perforated so as to allow VCI 30A in adhesive 30, if any, to pass from one side of composite layer 40 to the other. In certain embodiments, the perforations are circular and have a diameter of about 0.4 mm to about 1.6 mm. In certain embodiments, the perforations are circular and have a diameter of 0.397 mm to 1.588 mm. In one embodiment of the invention, the perforations cover from about 1% to about 10% surface area of scrim 70. The perforations cover 5% of the surface area of scrim 70 in one embodiment of the invention.

Second fibrous layer 80, in the embodiment shown, is constructed from thermoplastic fibers. In one embodiment of the invention, second fibrous layer 80 includes nylon 66. In another embodiment of the invention, second fibrous layer 80 includes PET. In other embodiments, second fibrous layer 80 is 100% polyester. The materials selected for second fibrous layer 80 are chosen and second fibrous layer 80 is constructed so as to be more hydrophobic (i.e., less hydrophilic) than first fibrous layer 60.

In certain embodiments of the invention, the fibers of first fibrous layer 60 are two times as moisture absorbent as are the fibers of second fibrous layer 80.

The fibers used to construct first fibrous layer 60 and second fibrous layer 80 may be modified to produce fibers having desired properties. For example, the fibers can be coated with a surfactant to increase or decrease their ability to absorb moisture.

Edge wrap 50, in the embodiment shown, includes a nonwoven layer 90, a covering 100, and an edge seal or tape 110. As shown in FIGS. 1 and 5, edge wrap 50 surrounds at least one edge of film 20 and composite layer 40 so as to extend partially up outer layer 20C of film 20 and second fibrous layer 80. In certain embodiments of the invention, edge wrap 50 extends from about 7.7 cm to about 121.0 cm up from the edge along the surface of outer layer 20C of film 20 and the surface of second fibrous layer 80. In one embodiment, edge wrap 50 extends from 7.62 cm to 121.92 cm up from the edge along the surface of outer layer 20C of film 20 and the surface of second fibrous layer 80.

In the embodiment shown, nonwoven layer 90 is constructed from one or more absorbent materials. Examples of suitable materials for nonwoven layer 90 include, but are not limited to, polyester, PET, PEBT, polypropylene, rayon, viscose, nylon, and nylon 66 fibers. In one embodiment of the invention, nonwoven layer 90 is about 70% viscose and about 30% PET by weight. In certain embodiments of the invention, nonwoven layer 90 is more hydrophilic than is first fibrous layer 60. In one embodiment, nonwoven layer 90 is twice as absorbent as is first fibrous layer 80. Nonwoven layer 90 can be embossed to create raised portions to increase the absorbency of nonwoven layer 90.

In certain embodiments of the invention, covering 100 is a film having a relatively low moisture vapor transmission rate. Covering 100 may be produced from, for example, HDPE, LDPE, and/or LLDPE. In one embodiment, covering 100 is constructed from about 0% to about 100% HDPE, from about 0% to about 100% LDPE, and from about 0% to about 100% LLDPE. In one embodiment of the invention, the moisture vapor transmission rate of covering 100 is less than about 10 g/day-m$^2$. In some embodiments, the moisture vapor transmission rate of covering 100 is less than about 5 g/day-m$^2$. In other embodiments, the moisture vapor transmission rate of covering 100 is less than 3 g/day-m$^2$, and preferably less than 2 g/day-m$^2$. Examples of acceptable films for use as covering 100 include, but are not limited to, those disclosed in U.S. Pat. Nos. 8,883,284 and 8,828,487, the disclosures of which are hereby incorporated by reference.

Edge seal 110 in the embodiment shown can be constructed from any one of a number of materials having sufficient durability to reinforce the edge of cover 10. Various pressure sensitive tapes are suitable for use as edge seal 110. For example, edge seal 110 can be a polyolefin film with a hot melt adhesive. Edge seal 110 can also include other additives, such as a UV stabilizer. In one embodiment, edge seal 110 is about 65% polyolefin film and about 35% hot melt adhesive. In one embodiment of the invention, edge seal 110 is a heavy duty, exterior grade, pressure sensitive, water proof tape made from polyethylene, such as TRAN-STAPE® available from Transhield, Inc. of Elkhart, Ind. Covering 100 and/or edge seal 110 can include perforations or openings 120 to allow moisture to exit cover 10, as described in greater detail below.

Edge wrap 50 may be formed by, for example, laminating nonwoven layer 90, covering 100, and edge seal 110 together, either with or without the use of an adhesive. The adhesive can include SEBS and/or SEPS, along with resins, tackifiers, a VCI and/or other components. In one embodiment of the present invention, the adhesive used in edge wrap 50 has from about 20% to about 50% SEBS, from about from about 50% to about 80% resins and tackifiers, from about 0% to about 10% VCI, and from about 0% to about 1% UV stabilizer. In certain embodiments, the adhesive includes from about 0.5% to about 1.0% UV stabilizer. In other embodiments, the adhesive includes from about 0.5% to about 1.0% UV stabilizer combined with an antioxidant.

Figure 3:
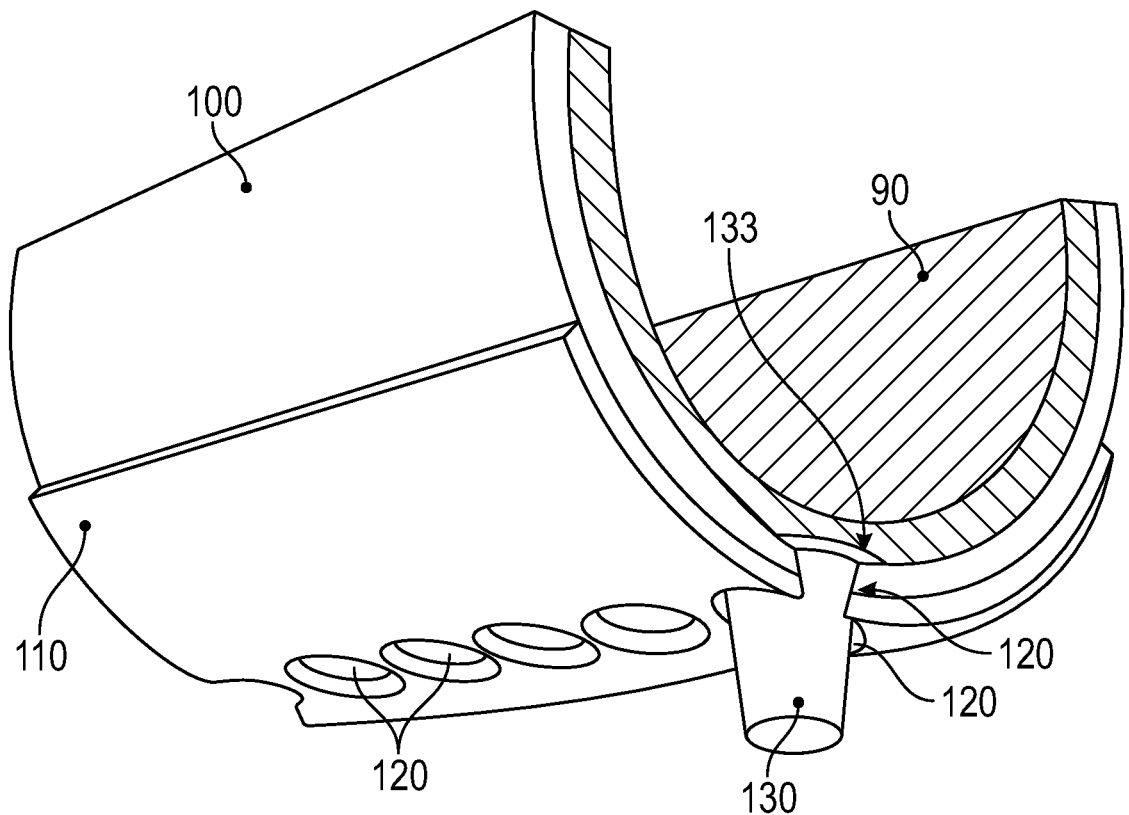
FIG. 3 is a perspective view of an edge wrap that is a component of the protective cover shown in FIG. 1.
Figure 4:
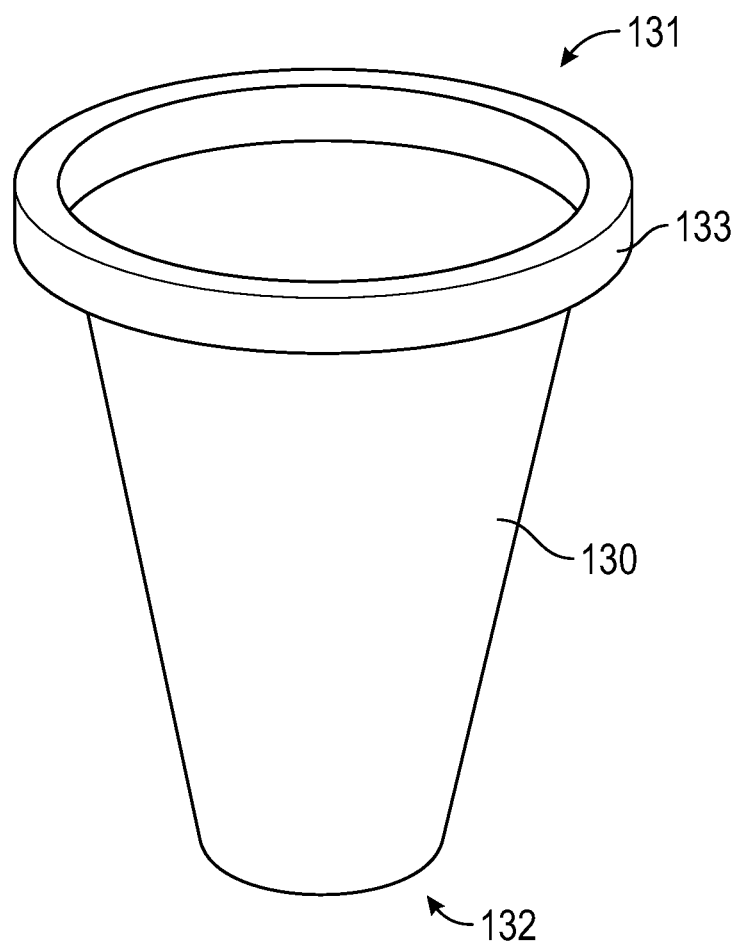
FIG. 4 is a perspective view of a funnel that is a component of the protective cover shown in FIG. 1.

In certain embodiments of the invention, one or more funnels 130 having a first or wider end 131, a second or narrower end 132, and an O ring 133 can be incorporated into cover 10. For example, in the embodiment shown in FIGS. 1, 3 and 5, second end 132 of funnel 130 is inserted through openings 120 in covering 100 and edge seal 110 until O ring 133 abuts the interior surface of covering 100 surrounding opening 120. Nonwoven layer 90 is then connected to the interior surface of covering 100.

Covers 10 according to the present invention can be also manufactured by laminating film 20 to composite layer 40. This can be achieved by applying an adhesive to the surface of first fibrous layer 60 that faces inner layer 20A of film 20, heating first fibrous layer 60 and film 20, and laminating composite layer 40 to film 20. In certain embodiments of the present invention, the adhesive applied to first fibrous layer 60 includes a styrenic block copolymer selected from the group of saturated thermoplastics. In one embodiment, the styrenic block copolymer in the adhesive applied to first fibrous layer 60 is from the same family as the styrenic block copolymer in adhesive 30. In other embodiments, the adhesive applied to first fibrous layer 60 includes a thermoplastic styrenic block copolymer from the same family as the styrenic block copolymer in film 20. However, the adhesive applied to first fibrous layer 60 need not have the exact same chemistry as adhesive 30. The adhesive applied to first fibrous layer 60 may be heated prior to application. Use of an adhesive on first fibrous layer 60 that is based on the same copolymer as adhesive 30 and/or the styrenic block copolymer in film 20 results in better bonding because the two adhesives and/or film will co-melt and co-solidify and fuse together. Embodiments of the invention that utilize styrenic block copolymers in this manner also show significantly improved bonding between film 20 and composite layer 40 under wet conditions. In some embodiments of the invention, the adhesive applied to first fibrous layer 60 includes from about 0% to about 1% UV stabilizer. In certain embodiments, the adhesive includes from about 0.5% to about 1.0% UV stabilizer. In other embodiments, the adhesive includes from about 0.5% to about 1.0% UV stabilizer combined with an antioxidant. After laminating film 20 to composite structure 40, edge wrap 50 may be secured around one or more edges of the film 20/composite layer 40 laminate as shown in FIGS. 1 and 5 by heat bonding, ultrasonic welding, adhesive, sewing or other methods.

Cover 10 of the present invention may be used to protect objects from the elements. For example, as shown in FIG. 5, cover 10 can be placed over an object 140 and heated so as to shrink film 20 and cause cover 10 to at least partially conform to the external configuration of object 140. The lower edges of cover 10 may be anchored in place during the shrinking process. Furthermore, other sections of cover 10 can be held in place, such as by tying, so as to help create the desired shape during the shrinking process. Cover 10 may be shrunk in advance and shipped to another location for use, or may be shrunk at the location of use.

Cover 10 can also be shaped into desired configurations by other methods. For example, films 20 of multiple, independent covers 10 can be welded to each other to form a desired configuration.

As shown in FIG. 5, moisture (including moisture vapor) can sometimes accumulate on or around object 140. Because second fibrous layer 80, scrim 70, and first fibrous layer 60 are arranged from least hydrophilic to most hydrophilic relative to the inside of the cover, moisture will move outward toward film 20. Some of the moisture will exit cover 10 through film 20 in the form of moisture vapor. Some of the moisture will move downward toward edge seal 50. This will occur as a result of both gravity and because nonwoven layer 90 is more absorbent than film 20, first fibrous layer 60, scrim 70, and second fibrous layer 80. As moisture accumulates in nonwoven layer 90, it will swell, which creates pressure that squeezes the moisture through openings 120 in covering 100 and edge seal 110. In embodiments of the invention that utilize one or more funnels 130, moisture that accumulates in nonwoven layer 90 will also flow into and along the inner walls of funnels 130 and out second end 132. Moisture can also directly condense on the inner walls of funnels 130 and flow out of cover 10 through second end 132.

Although the present invention has been shown and described in detail the same is to be taken by way of example only and not by way of limitation. Numerous changes can be made to the embodiments described without departing from the scope of the invention.

What is claimed is:
1. A cover, including:
   a film;
   a composite layer, the composite layer having a first fibrous layer connected to the film, the first fibrous layer having a hydrophilicity, a scrim having a hydrophilicity that is less than the hydrophilicity of the first fibrous layer, and a second fibrous layer having a hydrophilicity that is less than the hydrophilicity of the scrim; and
   an edge wrap surrounding a portion of the film and a portion of the composite layer, the edge wrap having a nonwoven layer having a hydrophilicity greater than the hydrophilicity of the first fibrous layer, a covering, and an edge seal.

2. The cover according to claim 1, wherein the film is a heat shrinkable film.

3. The cover according to claim 1, wherein the film is constructed at least in part from a styrenic block copolymer.

4. The cover according to claim 3, wherein the styrenic block copolymer is styrene-ethylene/butylene-styrene.

5. The cover according to claim 3, wherein the styrenic block copolymer is styrene-ethylene/propylene-styrene.

6. The cover according to claim 1, wherein the film has an inner layer connected to the first fibrous layer, at least one middle layer, and an outer layer.

7. The cover according to claim 6, wherein the inner layer includes a first amount of an antiblocking agent and the outer layer includes a second, lesser amount of an antiblocking agent.

8. The cover according to claim 3, further including an adhesive layer between the first fibrous layer and the film.

9. The cover according to claim 8, wherein the adhesive layer includes a styrenic block copolymer.

10. The cover according to claim 9, wherein the styrenic block copolymer in the film and the styrenic block copolymer in the adhesive layer are from the same family of styrenic bock copolymers.

11. The cover according to claim 1, further including an adhesive incorporated into the film.

12. The cover according to claim 1, wherein the scrim is located between the first fibrous layer and the second fibrous layer.

13. The cover according to claim 1, wherein the composite layer is perforated.

14. The cover according to claim 1, wherein the covering has at least one opening and the edge seal has at least one opening aligned with the opening in the covering.

15. The cover according to claim 14, further including a funnel extending through the opening in the covering and the opening in the edge seal.

16. The cover according to claim 1, wherein:
the first fibrous layer includes a first side connected to the film, a second side, and a plurality of non-uniform openings extending from the first side to the second side;
the scrim includes a first side connected to the second side of the first fibrous layer, a second side, and a plurality of openings extending from the first side to the second side;
the second fibrous layer includes a first side connected to the second side of the scrim, a second side, and a plurality of non-uniform openings extending from the first side to the second side; and
further including a plurality of perforations extending from the first side of the first fibrous layer, through the first fibrous layer, through the scrim, and through the second side of the second fibrous layer.

17. The cover according to claim 16, wherein the perforations have the same cross-section through the first fibrous layer, the scrim, and the second fibrous layer.

18. The cover according to claim 16, wherein the perforations are uniform in shape.

19. The cover according to claim 16, wherein the perforations are uniform in size.

* * * * *